Figure 1:
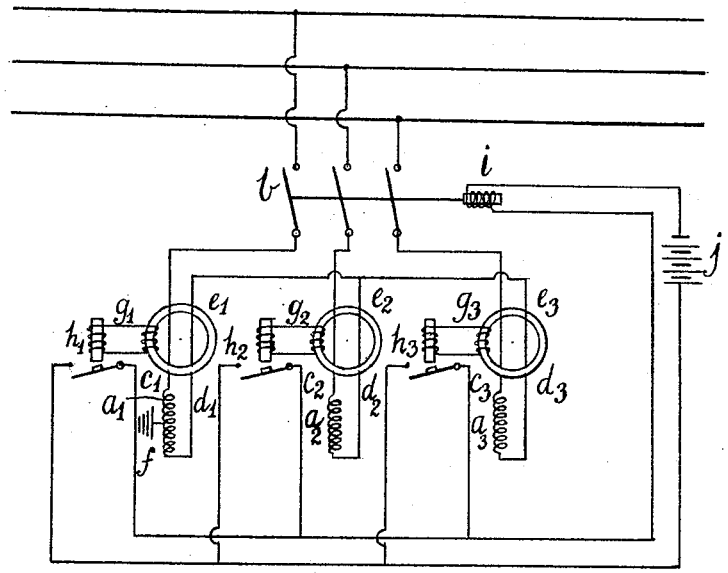

J. R. BEARD.
PROTECTING DEVICE FOR MULTIPHASE ALTERNATING CURRENT APPARATUS.
APPLICATION FILED OCT. 9, 1917.

1,398,620.

Patented Nov. 29, 1921.

INVENTOR
James Robert Beard

J. R. BEARD.
PROTECTING DEVICE FOR MULTIPHASE ALTERNATING CURRENT APPARATUS.
APPLICATION FILED OCT. 9, 1917.

1,398,620.

Patented Nov. 29, 1921.

WITNESSES.

INVENTOR.
James Robert Beard.

UNITED STATES PATENT OFFICE.

JAMES ROBERT BEARD, OF NEWCASTLE-UPON-TYNE, ENGLAND.

PROTECTING DEVICE FOR MULTIPHASE ALTERNATING-CURRENT APPARATUS.

1,398,620.  Specification of Letters Patent.  Patented Nov. 29, 1921.

Application filed October 9, 1917. Serial No. 195,633.

*To all whom it may concern:*

Be it known that I, JAMES ROBERT BEARD, a subject of the King of Great Britain, and a resident of Newcastle-upon-Tyne, in the county of Northumberland, England, have invented a new and useful Improvement in Protecting Devices for Multiphase Alternating-Current Apparatus, of which the following is a specification.

My invention relates to protecting devices and particularly to protecting devices for polyphase alternating-current apparatus.

One object of my invention is to provide means for disconnecting a polyphase apparatus from an electrical system upon the occurrence of internal faults in the apparatus.

Another object of my invention is to provide means whereby an unbalance between the current input and the current output of the windings of each phase of a polyphase apparatus may be employed to effect the disconnection of the apparatus from an electrical circuit to which it may be connected.

Another object of my invention is to provide a device, of the above-indicated character, that shall be energized only upon the occurrence of faulty conditions in the apparatus.

A further object of my invention is to provide a differential system of protection for the windings of an electrical apparatus in which the currents traversing the respective ends of the winding are balanced against each other in order that electro-responsive devices, that are actuated upon the occurrence of an unbalance between currents, may normally be deënergized.

Included in past attempts have been arrangements whereby a current transformer is provided at each end of each separate phase winding, the secondary effects of the current transformers in each phase winding being balanced against each other in such a manner that while the current passing through the winding is the same entering as leaving, the automatic devices do not operate, but in the event of any disparity of the current entering and leaving, the devices operate and the faulty apparatus is immediately disconnected from the system. The disadvantage of such an arrangement is that it is difficult to construct current transformers to give precisely similar effects on their secondary windings for equal currents in their primary windings and as a consequence the automatic devices are liable to operate on the occurrence of sudden overloads even though the apparatus may not be faulty.

The difficulty in balancing such current transformers is due to several causes. It is difficult to obtain iron for the cores having identical magnetic characteristics, both as regards permeability, hysteresis and the variation of these with the applied magnetizing force and further, even if the iron is identical, it is difficult to construct mechanically cores which will balance perfectly or maintain their balance under heavy overload conditions. Further difficulties are often experienced in maintaining an exact balance in the circuit containing the secondary windings of the transformers and the relay automatic devices. As it is also impossible to reproduce under test conditions the sudden overloads which may occur in practice, any such discrepancies in the balance are usually not discovered until the relays have operated improperly under working conditions and have thereby caused much inconvenience.

Other arrangements have been proposed for the purpose of protecting multiphase apparatus on the basis of the well known principle that in any multiphase circuit the sum of the currents is zero at every instant of time. Consequently, if a summation is made of the currents at all terminals in such a way that normally they are balanced, in the event of any current leaking from one or other of the windings, the balance is destroyed and the automatic device is operative. The disadvantage of such arrangements is that leakage may occur from one winding to another winding, which although it produces a fault in the apparatus still produces zero sum of the currents entering and leaving the terminals of the apparatus and as a consequence such devices are inoperative on such faults.

In practising my invention, I provide a current transformer comprising one core, one secondary winding and two primary windings for each phase winding or subdivision thereof of the multiphase apparatus to be protected. The two ends of the phase winding are connected to the two primary windings of the current transformer in such a manner that when the same current is entering the phase winding as leaves it the magnetic effects of these currents in the primary windings mutually balance with reference to the core and as a consequence there is no voltage induced in the secondary winding.

In the event, however, of a leakage from the phase winding, whether it be to ground or to a neighboring phase winding of the apparatus protected, the currents passing through the two primary windings of the current transformer no longer balance and a flux is produced in the core giving an induced electromotive force in the secondary winding. This induced electromotive force in the secondary winding is caused to actuate a relay whereby means are controlled to disconnect the apparatus from the system.

Figure 1 of the accompanying drawings is a diagrammatic view of an electrical circuit including a polyphase apparatus and a protective system embodying my invention.

Figure 2:
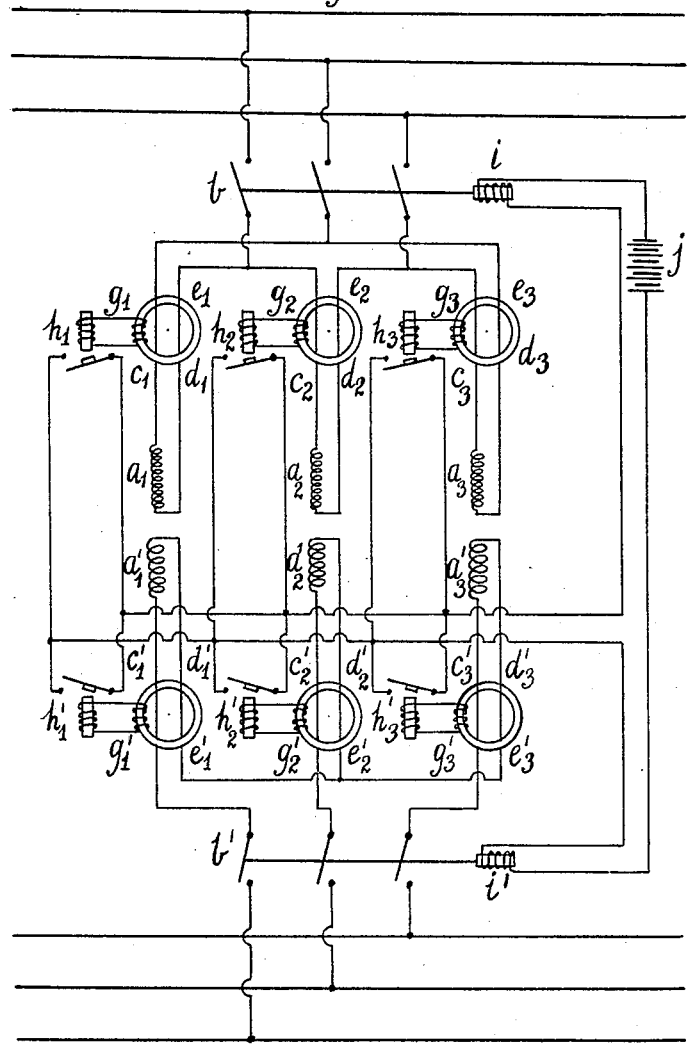

Fig. 2 is a diagrammatic view of an electrical circuit comprising a transformer and a protective system similar to that illustrated in Fig. 1.

In Fig. 1, a three-phase motor or generator comprising windings $a_1$, $a_2$ and $a_3$ is connected to a polyphase circuit through a circuit interrupter $b$ which is provided with a tripping mechanism $i$ that is energized upon the occurrence of abnormal conditions in the windings to actuate the interrupter to disconnect the windings from the circuit.

Protection is obtained for the winding $a_1$ by means of a transformer comprising a core member $e_1$, two primary windings that are respectively connected to the terminals $c_1$ and $d_1$ of the winding $a_1$, a secondary winding $g_1$ and a relay $h_1$ which is actuated upon faulty conditions in the winding $a_1$ to energize the tripping mechanism $i$ of the interrupter $b$.

Similar transformers and relays are provided for the windings $a_2$ and $a_3$ respectively, and are indicated on the drawing by means of subscripts corresponding to the number of the winding.

The windings $a_1$, $a_2$ and $a_3$ are thus connected by means of the primary windings of the respective transformers in star relation to the main circuit through the interrupter $b$.

While conditions in the windings are so normal that the full value of current that enters the winding also traverses the whole winding and both of the primary windings of the transformer, no flux is created in the core member $e_1$. When, however, a fault occurs in the windings, as for example, a ground upon one of the windings in a grounded system, the currents traversing the primary windings of the transformer are unbalanced. A flux is thereupon created in the core member $e_1$ that serves to energize the secondary winding $g_1$ and the relay $h_1$. The relay thereupon completes the energizing circuit which includes a control source $j$ for the tripping mechanism $i$ of the interrupter $b$.

Thus, upon the occurrence of a fault in a winding of the apparatus, the unbalance that is created between the currents traversing the primary windings of the transformer serves to energize the corresponding relay $h_1$, $h_2$, or $h_3$ to effect the opening of the interrupter and the disconnection of the apparatus from the circuit. It is to be observed that normally no flux traverses the core member $e_1$ but that flux is created only when the currents traversing the primary windings of the transformer become unbalanced.

In Fig. 2, similar transformers and relays are applied to the windings of a three-phase transformer in which high-tension windings are indicated as $a_1$, $a_2$ and $a_3$, respectively. The protective transformers and relays are correspondingly numbered in a manner similar to that described in Fig. 1.

The high-tension windings of the transformer are indicated as $a'_1$, $a'_2$ and $a'_3$, and the protective transformers and relays associated with the high-tension windings are correspondingly numbered.

The contact members of all of the relays that are associated with the several protective transformers and windings are arranged to complete the tripping circuit including trip coils $i$ and $i'$ of the high-tension and the low-tension interrupters $b$ and $b'$, respectively. Upon the occurrence of a fault in any one of the windings of the transformer, the operation of the relay associated with that winding effects the isolation of the transformer by disconnecting the same from both circuits between which it is connected.

It will be seen that with such arrangements applied to every phase winding of the multiphase apparatus or sub-division thereof, such for instance as each pole winding of each phase, the following results are obtained: The combination operates in the event of leakage from any phase winding whether to another phase winding or to earth. There is no liability to operate due to want of balance on sudden overloads even when the arrangement is operative for very small fault currents. In the case of power transformers protected in this manner, there are no difficulties due to the unbalancing effects of normal magnetizing current tappings and the abnormal magnetizing current which occurs on switching in.

It is to be understood that the term "winding" is used in the modern sense as will be understood by electrical engineers; the term does not necesarily imply a plurality of revolutions or even a single complete revolution around the core.

I claim as my invention:

1. In a protective device for an alternating-current apparatus, the combination with an electro-responsive device, of a transformer having a secondary winding operatively connected to the electro-responsive device and two oppositely acting primary windings connected in series with the winding of the apparatus to be protected.

2. In a protective device for an alternating-current apparatus, the combination with an electro-responsive device, of a transformer having a secondary winding operatively connected to the electro-responsive device and two oppositely-acting primary windings connected in series with, and on opposite sides of, the winding of the apparatus to be protected.

3. In a protective device for an alternating-current apparatus, the combination with an electro-responsive device, of a transformer having a secondary winding operatively connected to the electro-responsive device and two opposing primary windings so connected in series with the winding of the alternating-current apparatus that the transformer is deënergized under normal conditions in the said apparatus.

4. In a protective device for an alternating-current apparatus, the combination with an electro-responsive device, of a transformer having a secondary winding operatively connected to the electro-responsive device and two opposing primary windings so connected in series with the winding of the alternating-current apparatus that the secondary winding is normally deënergized.

5. In an electric circuit, the combination with a polyphase translating device, and means for disconnecting the same from the circuit, of a plurality of transformers severally having a secondary winding operatively connected to the disconnecting means and two primary windings for each winding of the translating device that neutralize each other under normal conditions in the translating device.

6. In an electric circuit, the combination with a polyphase translating device, and means for disconnecting the same from the circuit, of a plurality of transformers severally having a secondary winding operatively connected to the disconnecting means and two opposing primary windings connected in series with each winding of the translating device to cause the transformers to be energized only when a fault obtains in the translating device.

7. The combination with an electrical translating device and a circuit interrupter therefor, of a transformer having a winding for initiating the operation of the interrupter and other windings so connected in series with the winding of the translating device that they normally neutralize each other to prevent energization of the initiating winding.

8. The combination with an alternating-current apparatus, and a relay, of a transformer having a secondary winding connected to the relay, and primary windings so connected to one winding of the alternating-current apparatus that no magnetic flux traverses the core member of the transformer unless a fault obtains in the apparatus.

9. The combination with a main transformer and a relay circuit, of a transformer for each winding of the main transformer severally having a secondary winding operatively connected to the relay circuit and two oppositely acting primary windings connected in series with the respective main transformer winding.

In testimony whereof, I have hereunto subscribed my name this 15th day of September, 1917.

JAMES ROBERT BEARD.

Witnesses:
  Jas. Stewart Broadfort,
  Margaret S. Mayoh.